J. F. O'CONNOR.
WINDING MECHANISM.
APPLICATION FILED APR. 1, 1918.
1,300,473.
Patented Apr. 15, 1919.
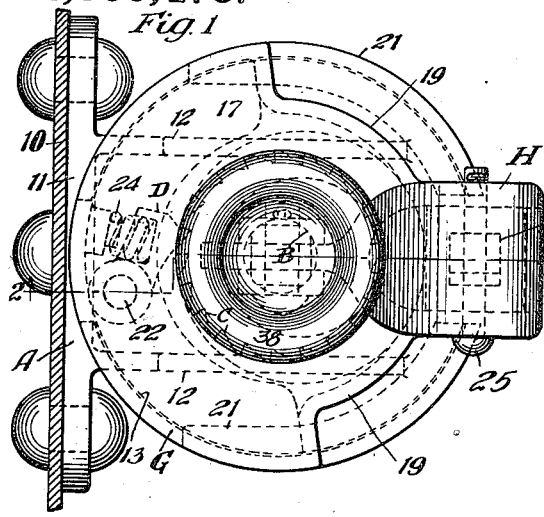
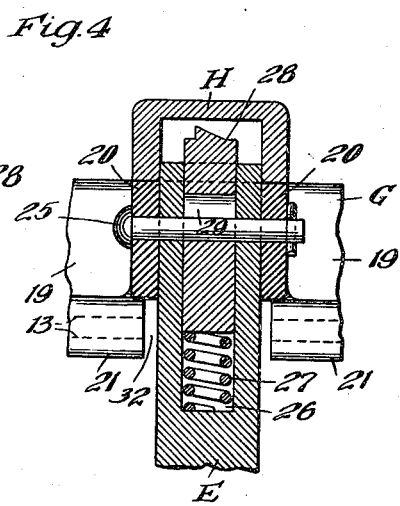
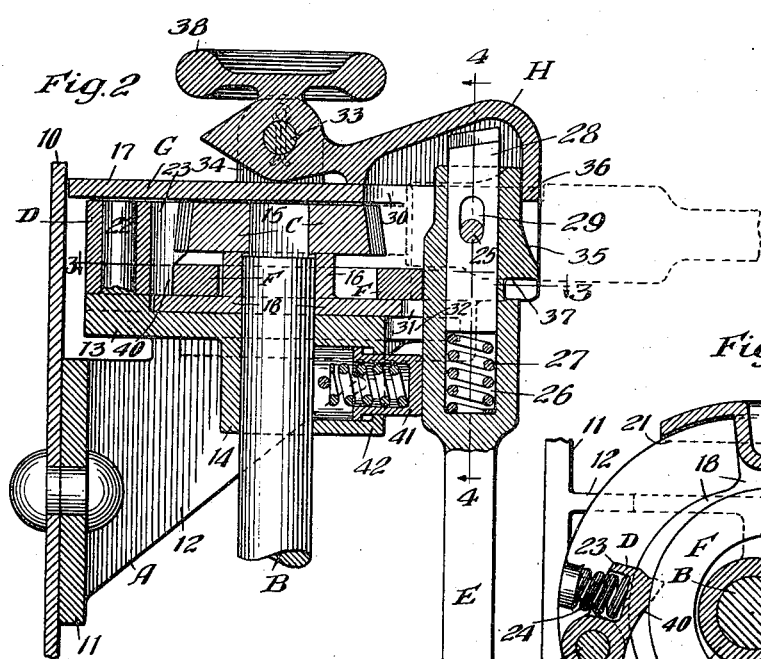
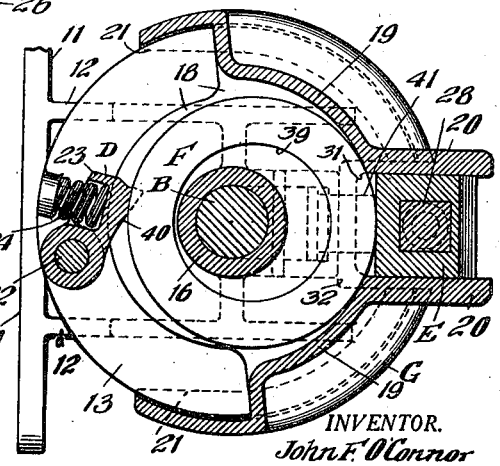
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

WINDING MECHANISM.

1,300,473. Specification of Letters Patent. Patented Apr. 15, 1919.

Application filed April 1, 1918. Serial No. 225,888.

*To all whom it may concern:*

Be it known that I, JOHN F. O'CONNOR, a citizen of the United States, residing at Chicago, in the county of Cook and State of Illinois, have invented a certain new and useful Improvement in Winding Mechanisms, of which the following is a full, clear, concise, and exact description, reference being had to the accompanying drawings, forming a part of this specification.

This invention relates to improvements in winding mechanisms.

One object of the invention is to provide a winding mechanism, more particularly a hand brake for railway cars and the like, which affords maximum simplicity of operation.

Another object of the invention is to provide a hand brake suitable for railway cars and so designed that the brake staff cannot be released when the operating handle is in either its operating position or any other position that might cause injury to the operator due to a sudden release of the brake staff which would carry the operating handle with it and thereby strike the operator.

Another object of the invention is to provide a winding mechanism such as a hand brake, wherein is employed a single operating handle for effecting the winding or tightening movement of the brake chain or the like and also for effecting the release when desired.

Other objects of the invention will more clearly appear from the description hereinafter.

In the drawing forming a part of this specification, Figure 1 is a top plan view of my invention as embodied in a hand brake for railway cars and showing the same applied to a wall of a car, the wall being shown in section. Fig. 2 is a vertical, sectional view, taken substantially on the line 2—2 of Fig. 1. Fig. 3 is a horizontal, sectional view, taken substantially on the line 3—3 of Fig. 2. And Fig. 4 is a detail sectional view, taken substantially on the line 4—4 of Fig. 2.

In said drawing, 10 denotes the wall of a car to which my improved hand brake is adapted to be secured. The brake, as shown, comprises a supporting bracket A, a vertical brake staff B, a ratchet wheel C, a locking dog D, a pawl operating handle E, a release plate F, a housing G and latch H, together with other minor details hereinafter described.

The bracket A comprises a vertical section 11 riveted to the wall 10 and from which extend outwardly a pair of vertical spaced flanges 12—12 having an upper, horizontal, circular plate or flange 13. Formed integrally with said bracket below the circular plate 13 and centrally of the latter is a bearing 14 for the brake staff B.

The brake staff B, at its extreme upper end, is preferably squared, as indicated at 15, to thereby receive the ratchet wheel C so that rotation imparted to the ratchet wheel will cause the brake staff to also rotate.

The brake staff between the squared section 15 and plate 13 is left round so as to form a suitable bearing for the bushing 16 of the housing G. Said housing G comprises an upper plate 17, a lower plate 18 seated on the top face of the plate 13, and a vertical connecting web 19 most clearly indicated in section in Fig. 3. The web 19 is formed in two separated substantially quadrant sections and has also a pair of laterally extended spaced lugs or ears 20—20. The housing G also is provided on its under side with a substantially semi-circular narrow flange 21 which is adapted to fit under the plate 13 when the parts are assembled, as hereinafter described.

Pivotally mounted on the stud 22 preferably formed integrally with the plate 13, is a dog 23 adapted to coöperate with the ratchet C, said dog 23 being normally held in operative relation with the ratchet wheel by a suitable spring 24.

The operating handle E normally assumes the depending vertical position shown in Fig. 2, said handle being pivoted on the pin 25 between the lugs or ears 20. The upper end of said handle E is provided with a relatively deep socket, as indicated at 26, and mounted in said socket is a spring 27 and a slidable single tooth pawl 28. The latter is prevented from accidental removal by the said pin 25 which passes through an elongated slot 29 in the pawl 28. The pawl 28 is normally projected to its outermost position under the influence of the spring 27 but, as will be apparent, said pawl is adapted to be forced inwardly against the action of the spring 27 when the pawl slides over the ratchet wheel C. To accommodate the handle E in its vertical position, the upper and lower walls 17 and 18 of the housing are suitably recessed, as indicated at 30 and 31 and a corresponding recess 32 is provided in the plate 13. The handle E is adapted to be elevated to horizontal position, as indicated by the dotted lines in Fig. 2, in which position the pawl 28 thereof will of course coöperate with the ratchet wheel C. Due to the fact that the housing G which carries the handle E, is rotatably or oscillatably mounted on the staff B, it is evident that the handle E and housing G may be oscillated to effect a step-by-step rotation of the brake staff B.

It is sometimes desirable to automatically hold the operating handle in its elevated operative position and to accomplish this result I employ the combined latch and weather shielding cap H. The latter is pivotally mounted on a pivot 33 carried by a pair of upstanding lugs 34 formed on the upper wall 17 of the housing G. The latch H is weighted so as to normally assume the position shown in Fig. 2. As the handle E is elevated, the cam surface 35 thereof lifts the latch H as the handle E comes to horizontal position, whereupon the latch H will have its outer edge 36 thereof dropped into the notch 37 formed on the handle, and in this way the handle E is held against falling. I preferably provide the latch H with a gripping handle or knob, indicated at 38, so as to afford the operator a suitable grip for the hand which is not being used for operating the handle E. Said knob 38 also permits of the ready disengagement of the latch H from the handle E when it is desired to drop the latter.

In order to release the brake staff at any time when the chain is wound thereon and the brakes are under tension, I provide the release plate F which is preferably an annular member, as clearly shown in Fig. 2. The central opening 39 thereof is made considerably larger than the diameter of the bushing 16 so that said plate F is permitted considerable horizontal movement for the purpose hereinafter described. The plate F is normally positioned as shown in Fig. 3, said plate F being held in this position by the pawl D which is extended downwardly below its tooth portion, as indicated at 40, and engages the edge of the plate F. The plate F is not affected by the operating handle E so long as the latter does not swing beyond the vertical to the left, as viewed in Fig. 2, and in order to prevent any accidental actuation of the release plate F due to the falling of the handle E, I provide a spring actuated button 41 mounted in a suitable enlargement 42 of the bearing 14. When, however, it is desired to release the brake staff, the operator will swing the handle E to the left, as viewed in Fig. 2, against the action of the button 41 and this will, of course, force the plate F to the left and disengage the pawl D from the ratchet wheel C.

The parts are so arranged that they are all held in operative position when the brake staff B is inserted, the parts being assembled in the following manner: After the bracket A is secured to the car wall, the dog D may be applied and then the housing G is slipped horizontally over the bracket and with the flange 21 thereof fitting underneath the plate 13. The ratchet wheel C and release plate F are placed within the housing G before it is slipped into position, as will be understood. The brake staff B is then inserted vertically, which will prevent the housing G from moving laterally and due to the flange 21 of the housing, the latter cannot be lifted up so that all parts are securely held against accidental displacement and at the same time a complete housing, substantially weather proof, is provided for all the operating parts.

From the preceding description, it will be seen that I employ a single handle for effecting the step-by-step winding operation and for effecting the release. Furthermore, the release cannot be effected accidentally since the housing G and the handle E must always be brought to the position where the handle E will enter the slot 32 of the plate 13 and then the handle must be positively actuated to the left, as viewed in Fig. 2, to overcome the spring button 41 and force the plate F to disengage the dog. Under no conditions, is it possible to effect the release when the handle E is in its operative position or in any position except substantially vertical so that danger of injuring the operator resulting from the operating handle being suddenly swung by the brake staff when released, is positively avoided. The device is exceedingly simple, compact and safe.

Although I have herein shown and described what I now consider the preferred manner of carrying out the invention, the same is merely illustrative and I contemplate all changes and modifications that come within the scope of the claims appended hereto.

I claim:

1. In a mechanism of the character described, the combination with an element adapted to be rotated; of means for rotating said element step-by-step in one direction and including an operating handle and a pawl normally disposed in an inoperative position under the influence of gravity but adapted to be moved in one manner to operative position; separate means for locking said element against reverse rotation; and means, including a slidable member interposed between said locking means and said handle adapted to be actuated by said handle when moved in a different manner to release the locking means and thereby said element.

2. In a mechanism of the character described, the combination with an element adapted to be rotated; of means for rotating said element step-by-step in one direction and including a pawl and a pivotally mounted operating handle normally hanging in a vertical inoperative position under the influence of gravity but adapted to be elevated to horizontal operative position; separate means for locking said element against reverse rotation; and movable means interposed between said locking means and said handle adapted to be actuated by the latter to release said locking means, said releasing means being operable only by said handle and when the latter and said pawl are in inoperative position relatively to the rotating means.

3. In a mechanism of the character described, the combination with a vertical rotatable brake staff; of means for rotating said stag step-by-step in one direction and including a gravity actuated operating handle adapted to be elevated to operative position; means for locking said staff against reverse rotation; and means including a member slidable transversely of the staff for disengaging said locking means operable upon movement of said handle while in its gravity controlled position.

4. In a mechanism of the character described, the combination with an element adapted to be rotated in one direction, of pawl and ratchet means for effecting said rotation including a pivotally mounted operating handle normally depending vertically and in an inoperative position and adapted to be raised to horizontal operative position; a locking dog coöperable with the ratchet; and means for disengaging said dog upon swinging said handle from vertical inoperative position in a direction opposite to that employed for swinging the handle to operative position.

5. In a mechanism of the character described, the combination with an element adapted to be rotated; of means for rotating said element in one direction, said means having operative and inoperative conditions; means for locking said element against reverse rotation; and means, operable only when said first named means are in inoperative condition, for releasing said locking means, said means including a member slidable transversely of the staff.

6. In a mechanism of the character described, the combination with a rotatable element and an operating handle coöperable therewith, said operating handle normally depending vertically in an inoperative position under the influence of gravity and adapted to be elevated to horizontal operative position; and automatically acting means for holding said handle in its elevated position, said means including a pivoted latch coöperable with a recess in said handle and a cam on the latter for elevating the latch so as to drop it into said recess while the handle is being lifted to operative position.

7. In a mechanism of the character described, the combination with a rotatable element; of a ratchet wheel rotatable in unison with said element; a gravity controlled pivotally mounted operating handle having a spring controlled pawl, said pawl being normally disengaged from the ratchet wheel but adapted to be engaged therewith when the handle is elevated; a pivotally mounted dog also coöperable with said ratchet wheel to hold the latter; and means, straddling said rotatable element and slidable with respect thereto interposed between said dog and handle adapted to be actuated by the latter to release said dog when said pawl is disengaged from the ratchet wheel.

8. In a hand brake for railway cars, the combination with a bracket adapted to be secured to a wall of a car; of a vertical brake staff journaled in said bracket and having a ratchet wheel mounted thereon; of a housing oscillatably mounted on said bracket; an operating handle pivotally mounted on the housing and normally hanging in a vertical position, said handle having a spring controlled pawl disengaged from the ratchet wheel when the handle is in said vertical position, said pawl being engageable with the ratchet wheel when the handle is raised to horizontal position; a pivotally mounted dog coöperable with said ratchet wheel to hold the staff against reverse rotation; a slidably mounted element carried by the bracket and extending between said pawl and said handle when the latter is in its vertical inoperative position; and means for preventing accidental movement of said handle beyond its normal vertical position and in a direction opposite to that required to move the handle to operative position, said slidable element being actuated by the handle to disengage the dog only upon positive movement of said handle beyond its vertical position.

In witness that I claim the foregoing I have hereunto subscribed my name this 28th day of March, 1918.

JOHN F. O'CONNOR.